United States Patent [19]

Balakrishnan et al.

[11] Patent Number: 5,101,347
[45] Date of Patent: Mar. 31, 1992

[54] SYSTEM FOR REDUCING SKEW IN THE PARALLEL TRANSMISSION OF MULTI-BIT DATA SLICES

[75] Inventors: Ramanatha V. Balakrishnan, Saratoga; Desmond W. L. Young, Campbell, both of Calif.

[73] Assignee: National Semiconductor Corporation, Santa Clara, Calif.

[21] Appl. No.: 272,589

[22] Filed: Nov. 16, 1988

[51] Int. Cl.⁵ .................. G06F 3/00; G06F 13/42; G06F 13/38

[52] U.S. Cl. .................. 395/800; 364/238.6; 364/238.9; 364/240; 364/240.1; 364/240.3; 364/241.9; 364/260; 364/260.3; 364/271.9; 364/932.8; 364/935.42; 364/935; 364/935.2; 364/935.4; 364/927.92; 364/927.93; 364/927.94; 364/927.95; 364/DIG. 1; 364/DIG. 2; 340/825.14; 340/825.2

[58] Field of Search ... 364/200 MS File, 900 MS File; 340/825.14, 825.20

[56] References Cited

U.S. PATENT DOCUMENTS

| | | | |
|---|---|---|---|
| 4,320,452 | 3/1982 | Kempf et al. | 364/200 |
| 4,322,794 | 3/1982 | Kurakake | 364/200 |
| 4,451,886 | 5/1984 | Guest et al. | 364/200 |
| 4,453,211 | 6/1984 | Askinazi et al. | 364/200 |
| 4,471,427 | 9/1984 | Harris | 364/200 |
| 4,570,220 | 2/1986 | Tetrick et al. | 364/200 |
| 4,773,040 | 9/1988 | Nagamine et al. | 364/900 |
| 4,881,165 | 11/1989 | Sager et al. | 364/200 |
| 4,888,684 | 12/1989 | Lilja et al. | 364/200 |
| 4,918,644 | 4/1990 | Terada et al. | 364/900 |

*Primary Examiner*—Thomas C. Lee
*Assistant Examiner*—Krisna Lim
*Attorney, Agent, or Firm*—Limbach & Limbach

[57] ABSTRACT

A system for reducing skew in the parallel transmission of digital data slices is provided. The system includes a transmitter unit comprising a plurality of transmitter memory devices. Control logic provides a strobe signal to each transmitter unit memory device to implement the transfer of a desired number of data characters from the transmitter unit to a receiver unit. Both its associated data slice and the strobe signal are transferred from each transmitter unit memory device to the bus via an associated transmitter unit bus driver. Each data slice and its associated strobe signal are then transferred from the bus to a corresponding receiver unit memory device via a corresponding receiver unit bus receiver device. Each receiver unit memory device includes means for generating a "receiver-full" status signal that indicates that all data slices transferred from the corresponding transmitter unit memory device have been received. These "receiver-full" status signals are monitored and a "transfer-done" status signal is issued when all data slices transferred from the transmitter unit have been received by the receiver unit. Skew within a particular transmission path is compensated for by providing a controlled delay path for the clock signal in each device within that path.

3 Claims, 1 Drawing Sheet

SYSTEM FOR REDUCING SKEW IN THE PARALLEL TRANSMISSION OF MULTI-BIT DATA SLICES

BACKGROUND OF THE INVENTION

1. Field of the Invention

The present invention relates to the transmission of digital data characters in parallel data slices, and in particular, to a technique for improving bus transfer rates by allowing an individual data slice and its associated clock signal to flow through the same data path, thereby reducing skew.

2. Discussion of the Prior Art

Referring to FIG. 1, a conventional system for transmitting data characters over a bus in multiple parallel data slices typically utilizes transceiver devices connected to the bus for transferring the data characters to and from the bus. According to conventional bus interface architecture, each module on a plug-in board includes a number of separate, parallel-configured, integrated circuit memory chips, such as slice-wide first-in-first-out (FIFO) memory devices of a desired depth, each of which serves as either a "transmitter" or "receiver" storage device for a data slice path. Each "transmitter" memory chip utilizes a separate, dedicated transmitter unit bus driver chip to sequentially pass data slices from its associated memory chip to the bus. Similarly, each "receiver" memory chip utilizes a separate, dedicated receiver unit bus receiver chip to sequentially pass data slices from the bus to its associated receiver memory device.

For example, to implement the transmission of a 32-bit data character, i.e. doubleword data, each of four 8-bit wide transmitter FIFO chips provides a data path for transferring byte-wide data slices through four associated bus driver chips to the data bus for capture by a similarly configured receiver arrangement.

The use of this conventional data path configuration requires external control logic to implement the protocol for data transfers. That is, a separate logic chip implements the bus protocol for the transmission.

The disadvantage of this design is that the timing of the data path for each data slice and for the protocol logic of the control path are on separate integrated circuit chips, thereby introducing skew in the received data. Typically, the propagation delay through conventional integrated circuit devices used in these applications, based on process variation, temperature variation and $V_{cc}$ variation, ranges from a minimum of 1 nsec. to a maximum of 7 nsec. Thus, each of the four chips comprising each data slice path, i.e., transmitter memory, bus driver, bus receiver and receiver memory, can introduce up to a 6 nsec. propagation delay difference in the parallel data slice paths.

These skew effects severely limit performance. Since one control strobe is used as the common clock for all of the data path elements, the transfer rate for each data character must be assumed to be limited by the worst case propogation delay for each device. Thus, as shown in FIG. 1, in the typical case, a skew delay of 24 nsec. must be built into the receiver unit to ensure that the control strobe arrives after the received data is valid. This limits data transfer rates to about 40 million transfers per second.

SUMMARY OF THE INVENTION

The present invention provides a technique for transferring parallel data slices over a bus as quickly as possible in a manner which minimizes skew effects. The objective is to reduce the skew effects between parallel data slice paths and between relative bit paths within a slice.

In keeping with the concepts of the present invention, each integrated circuit chip within a data path from a transmitter unit to a corresponding receiver unit integrates both a control strobe path and a data slice path. Each chip within a data path also incorporates its own synchronizer so that skew effects between devices within a data path are removed. Thus, the worst-case delay experienced in one complete transfer of multiple data characters is 24 nsec., compared with the fixed 24 nsec. delay experienced for transfer of each data character in the conventional transmission system.

As stated above, skew within a data path is compensated for by providing a controlled delay path for the strobe signal in each chip within that path. This strobe path delay is designed to be longer than any data path delay in the device. Thus, all data is guaranteed to be valid at each strobe transition.

Accordingly, the present invention provides a system for reducing skew in the parallel transmission of digital data slices from a transmitter unit to a receiver unit via a data bus. The system comprises a transmitter unit that includes a plurality of transmitter unit memory devices for storing data slices. Control logic provides a strobe signal to each transmitter unit memory device to implement the transfer of a desired number of data characters from the transmitter unit to the receiver unit. Both the strobe signal and its associated data slice are transferred from each transmitter unit memory device to the bus via an associated transmitter unit bus driver device. Each data slice and its associated strobe signal are then transferred from the bus to a corresponding receiver unit memory device via a corresponding receiver unit bus receiver device.

Each receiver unit memory device includes means for generating a "receiver-full" status signal that indicates that all data slices transferred from the corresponding transmitter unit memory device have been received. These "receiver-full" status signals are monitored and a "transfer-done" status signal is issued to the receiver control logic when all data slices transferred from the transmitter unit have been received by the receiver unit.

These and other objects and advantages of the present invention will be better understood by reference to the detailed description of the invention provided below which should be considered in conjunction with the accompanying drawings.

DETAILED DESCRIPTION OF THE INVENTION

Figure 1:
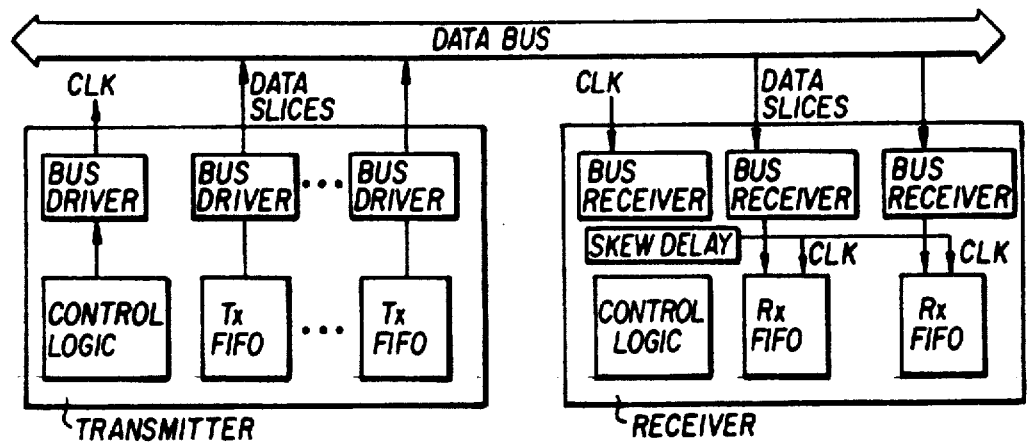
FIG. 1 is a block diagram illustrating a conventional skew limited data slice transfer system.
Figure 2:
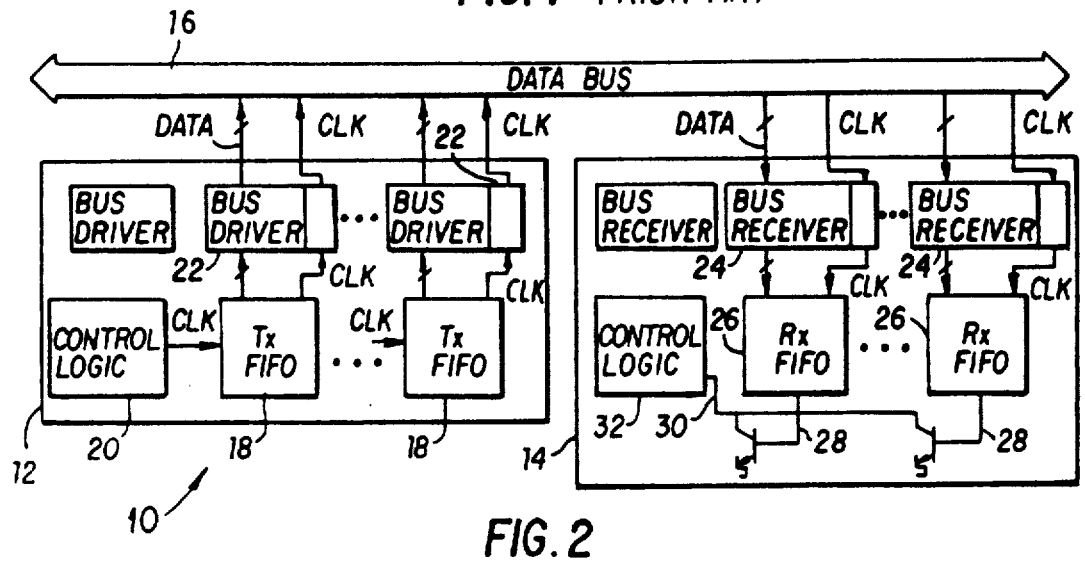
FIG. 2 is a block diagram illustrating an automatic skew compensated data slice transfer system in accordance with the present invention.

FIG. 2 shows a system 10 for transmitting data characters in multiple, parallel data slices from a transmitter unit 12 to a receiver unit 14. The transmitter unit 12 includes a plurality of transmitter unit memory devices 18, which are illustrated in FIG. 2 as slice-wide, first-in-first-out (FIFO) memory devices. Each transmitter unit memory device 18 is implemented as a separate integrated circuit chip and includes a plurality of storage locations for storing slice-wide data.

Conventional transmitter control logic 20 provides a clock or strobe signal CLK to each transmitter unit memory device 18 to implement the transfer of a desired number of data characters from the transmitter unit 12 to the receiver unit 14. Thus, the multiple data slices comprising each data character to be transferred are stored in the parallel-configured transmitter unit memory devices 18 and are transferred from the transmitter unit memory devices 18 in parallel in response to the clock signal CLK. That is, the control logic 20 may request that one or more data characters be transmitted to the receiver unit 14. These data characters are then transmitted individually, in sequence, under control of the clock signal CLK, with each character in the sequence being transmitted as multiple, parallel data slices.

In accordance with the present invention, each transmitter unit memory device 18 provides a path not only for its data slice but also for the clock signal CLK to the bus 16 via a corresponding transmitter unit bus driver device 22. According to conventional architecture, each bus driver device 22 is implemented as a separate IC chip.

At the receiver unit 14, the data slice and clock signal CLK transferred to the bus 16 by a particular transmitter unit memory device 18 are removed from the bus and passed via a corresponding receiver unit bus receiver device 24 to a corresponding receiver unit memory device 26. As with the transmitter unit 12, each bus receiver device 24 and each receiver unit memory device 26 is implemented as a separate chip. Similarly, each of the receiver unit memory devices 26 includes a plurality of storage locations for storing received data slices so that a full multiple data character transmission can be received in a single read reference to the transmitter unit 12.

As is common in bus interface devices, each receiver unit memory device 26 includes means for generating a "receiver-full" status signal 28 indicating that all of the digital data slices transferred from the corresponding transmitter unit memory device 18 have been received. As shown in FIG. 2, the receiver-full status signal 28 generated by each receiver unit memory device 26 is monitored by wired OR logic and a "transfer-done" status signal 30 is provided to the receiver control logic 32 when all digital data slices transferred from the transmitter unit 12 have been received by the receiver unit 14.

Figure 3:
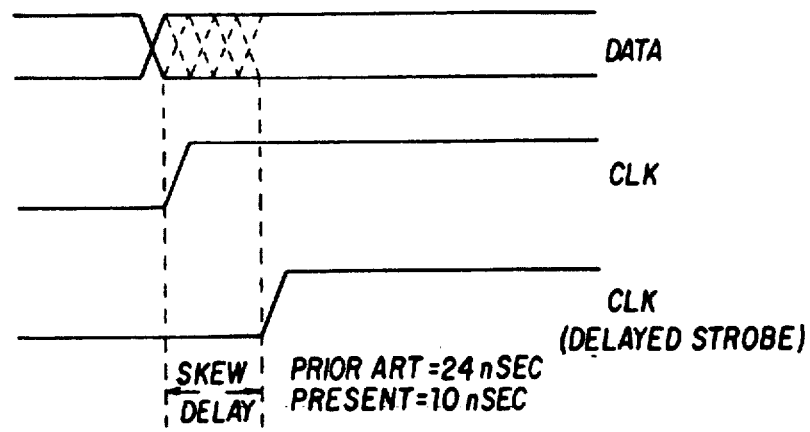
FIG. 3 is a timing diagram illustrating the delayed strobe synchronizer signal utilized in implementing the automatic skew compensation system of the present invention.

Skew within a particular transmission path from a selected transmitter unit memory device 18 to its corresponding receiver unit memory device 26 is compensated for by providing a controlled delay path for the strobe signal CLK in each IC chip in that path. Since, as illustrated in FIG. 3, this delay path is designed to be longer than any data path within that chip, all data is guaranteed to be valid in that chip at each strobe transition.

Thus, in the system of the present invention, both slice-wide data and clock signals flow through the same chips, eliminating chip-to-chip skew. With current processing technology, on-chip paths can be easily matched within 2 nsec. As technology increases in speed, this number will decrease. Therefore, the sum of these skews in a data slice path can maintained under 10 nsec., allowing 100 million transfers per second compared with 40 million transfers per second in the conventional system.

It should be understood that various alternatives to the embodiment of the invention described herein may be employed in practicing the invention. It is intended that the following claims define the scope of the invention and that the structure within the scope of these claims and its equivalents be covered thereby.

What is claimed is:

1. A system for reducing skew in the parallel transmission of a data character that includes a plurality of multi-bit data slices from a transmitter unit to a receiver unit via a parallel data bus that includes a plurality of data paths, the system comprising:
   (a) a plurality of transmitter unit memory devices, each transmitter unit memory device including at least one storage location for storing a multi-bit data slice;
   (b) control logic for simultaneously providing a strobe signal to each transmitter unit memory device;
   (c) a plurality of transmitter unit bus drivers, each one of said transmitter unit bus drivers connected between a corresponding one of the data paths of the parallel data bus and a corresponding one of the transmitter unit memory devices for transferring a multi-bit data slice and the strobe signal from the corresponding transmitter unit memory device to the corresponding data path;
   whereby the plurality of multi-bit data slices is transferred to the parallel data bus;
   (d) a plurality of receiver unit memory devices, each receiver unit memory device including at least one storage location for storing a multi-bit data slice; and
   (e) a plurality of receiver unit bus receivers, each one of said receiver unit bus receivers connected between a corresponding one of the data paths of the parallel data bus and a corresponding receiver unit memory device for transferring a multi-bit data slice and the strobe signal from the corresponding data path to the corresponding receiver unit memory device.

2. A system as in claim 1 and wherein each receiver unit memory device includes means for generating a receiver-full status signal indicating that the multi-bit data slice transferred from the corresponding transmitter unit memory device has been received.

3. A system as in claim 2 and further including monitoring means connected to each receiver unit memory device for monitoring the receiver-full status signal of each receiver unit memory device and form issuing a transfer-done status signal when each receiver-full status signal indicates that a multi-bit data slice has been received.

* * * * *